United States Patent [19]

Nishiyama et al.

[11] Patent Number: 4,909,224

[45] Date of Patent: Mar. 20, 1990

[54] ELECTRONIC CONTROLLER FOR INTERNAL COMBUSTION ENGINE

[75] Inventors: Ryoji Nishiyama; Satoru Ohkubo, both of Amagasaki; Setsuhiro Shimomure, Himeji, all of Japan

[73] Assignee: Mitsubishi Denki Kabushiki Kaisha, Tokyo, Japan

[21] Appl. No.: 160,481

[22] Filed: Feb. 25, 1988

[30] Foreign Application Priority Data

Feb. 27, 1987 [JP] Japan ............................... 62-45644

[51] Int. Cl.$^4$ .............................................. F02P 5/04
[52] U.S. Cl. ..................................... 123/492; 123/422
[58] Field of Search ............................... 123/492, 422

[56] References Cited

U.S. PATENT DOCUMENTS

| | | | |
|---|---|---|---|
| 4,285,314 | 8/1981 | Kiencke | 123/422 |
| 4,389,992 | 6/1983 | Shigematsu | 123/422 |
| 4,448,163 | 5/1984 | Yoshida | 123/422 |
| 4,487,190 | 12/1984 | Isobe | 123/492 |
| 4,512,318 | 4/1985 | Ito | 123/492 |
| 4,597,370 | 7/1986 | Yasuoka | 123/492 |
| 4,616,619 | 10/1986 | Saito | 123/492 |
| 4,658,789 | 4/1987 | Morita | 123/422 |
| 4,682,577 | 7/1987 | Kato | 123/492 |
| 4,745,901 | 5/1988 | Reifenberger | 123/492 |

FOREIGN PATENT DOCUMENTS

| | | |
|---|---|---|
| 48-18695 | 3/1973 | Japan . |
| 58-48738 | 3/1983 | Japan . |
| 58-160530 | 9/1983 | Japan . |
| 59-113269 | 6/1984 | Japan . |

OTHER PUBLICATIONS

"Analysis of a Surging Phenomenon In a Transition Condition", SAE of Japan Scientific Lecture No. 802A75.

Primary Examiner—Carl S. Miller
Attorney, Agent, or Firm—Burns, Doane, Swecker & Mathis

[57] ABSTRACT

The electronic controller for an internal combustion engine is adapted to reduce an output power of the internal combustion engine by controlling a fuel supply quantity or an ignition angle during a predetermined duration from a timing when a vehicle was brought into an accelerated condition, so that an output power of the engine is reduced for an predetermined duration before the first positive peak of a acceleration vibration of the vehicle is generated with an increase of the output power of the engine to suppress the acceleration vibration in longitudinal direction.

8 Claims, 7 Drawing Sheets

Fig. 7

ELECTRONIC CONTROLLER FOR INTERNAL COMBUSTION ENGINE

BACKGROUND OF THE INVENTION

1. Field of the Invention

This invention relates to an electronic controller for controlling an internal combustion engine for vehicles, in particular to an electronic controller for preventing the acceleration vibration in longitudinal direction of the vehicle when the vehicle is accelerated.

2. Description of the Prior Art

Figure 1:
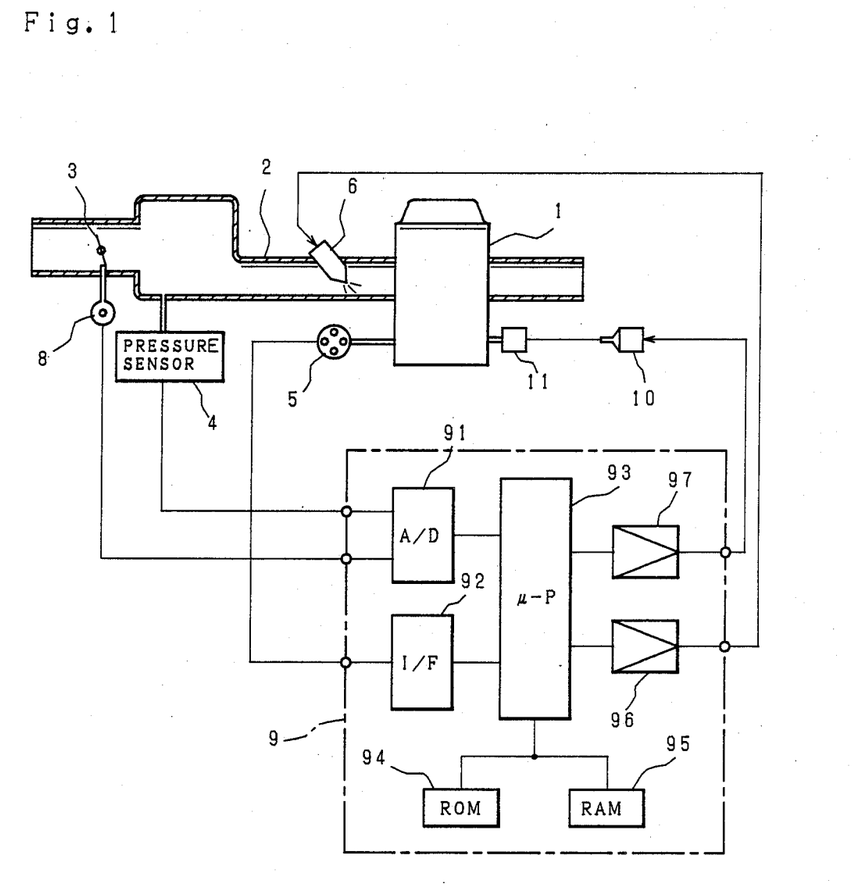
FIG. 1 is a schematic view showing a construction of a general internal combustion engine and a block diagram showing a construction of an electric controller for the internal combustion engine.

FIG. 1 is a block diagram showing a general construction of an electronic controller for an internal combustion engine shown together with a schematic diagram showing a basic construction of the internal combustion engine.

One example of the conventional electronic controller for an internal combustion engine, for example an apparatus disclosed in Japanese Patent Laid-Open No. 59-96446 (1984), is first described with reference to FIG. 1.

In the drawing, reference numeral 1 designates an internal combustion engine, reference numeral 2 designating a suction pipe connected with the internal combustion engine 1, and reference numeral 3 designating a throttle valve disposed in said suction pipe 2.

A pressure within the suction pipe 2 is detected by a pressure sensor 4 and the detected pressure is transmitted to an AD converter 91. A number of revolution (engine speed) of the internal combustion engine 1 is detected by a revolution sensor 5 in the form of pulse number and an output of the revolution sensor 5 is transmitted to an input circuit 92. In addition, an injector 6 is adapted to jet a fuel into the suction pipe 2 and is driven by an output of an output circuit 96. In addition, the throttle valve 3 is provided with a throttle-opening sensor 8 for detecting an opening thereof connected therewith. An output corresponding to the throttle-opening is transmitted to the AD converter 91.

Reference numeral 11 is a distributor which is connected between ignition plugs (not shown) and an ignition coil 10. The ignition coil are driven by an output signal of an output circuit 97, so that the ignition timing of the engine 1 is controlled.

On the other hand, reference numeral 9 designates a controller for calculating a required fuel quantity from informations of the pressure sensor 4, the revolution sensor 5, the throttle-opening sensor 8 and the like and generating a driving pulse width of the injector 6. The AD converter 91 in the controller 9 converts analog signals from the throttle-opening sensor 8, the pressure sensor 4 and the like to digital values which are transmitted to a micro processor ($\mu$-P) 93. The input circuit 92 level-converts the pulse output signal of the revolution sensor 5 and an output from the input circuit 92 is transmitted to the micro processor 93.

The micro processor 93 calculates a supply fuel quantity to the internal combustion engine 1 on the basis of the digital pulse signals outputted from the AD converter 91 and the input circuit 92 and determines the driving pulse width of the injector 65 correspodning to the calculated result to output it. The controlling procedure and data for the micro processor 93 are previously stored in a ROM 94 and data under the calculating process are temporarily stored in a RAM 95. And, the injector 6 is driven by means of the output circuit 96 corresponding to an output signal from the micro processor 93.

Figure 2:
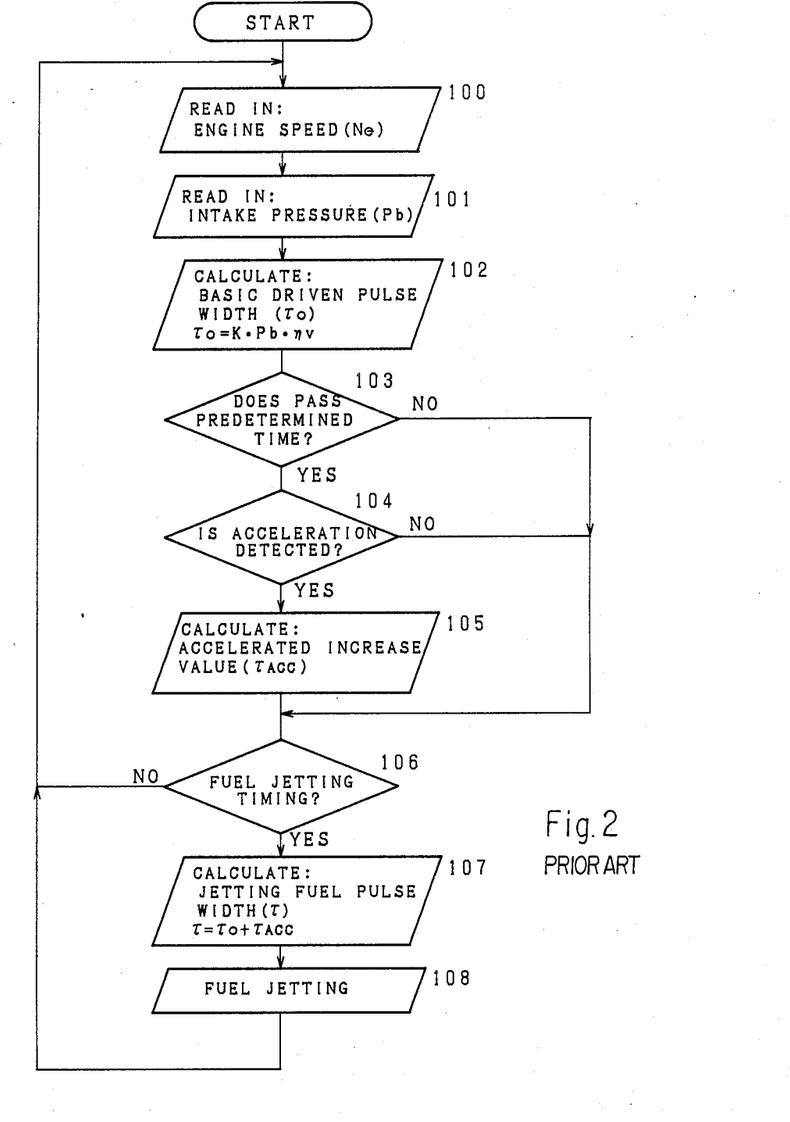
FIG. 2 is a flow chart showing a processing procedure for the conventional electronic controller for an internal combustion engine.

Nextly, an operation of the above described conventional apparatus is described with reference to a flow chart shown in FIG. 2.

At first, in a step 100, a pulse signal, that is, a revolution number Ne of an engine, inputted from the revolution sensor 5 is read into micro processor 93; in a step 101, a value Pb of a intake pressure (absolute pressure) in the suction pipe 2 obtained from the pressure sensor 4 is read into micro processor 93; and in a step 102, the basic driving pulse width $\tau_o$ of the injector 6 is calculated on the basis of the read-in informations.

An operational equation of above calculation is expressed by $$\tau_o = K \cdot Pb \cdot \eta v,$$

wherein K is constant; $\eta v$ is a charging efficiency previously determined in correspondence to the intake pressure Pb within the suction pipe 2 and the revolution number Ne of the engine 1.

Subsequently, the operation enters a step 104 periodically through a step 103, where it is judged whether a variation of quantity of the output from the throttle-opening sensor 8 exceeds the predetermined value or not. In the case where the variation of change of the output from the throttle-opening sensor 8 exceeds the predetermined value, it is judged as an accelerated condition and the operation enters a step 105, where a jetting pulse width $\tau_{Acc}$ corresponding to the accelerated increase in value is calculated, and then the operation enters a step 106.

Also in the case where it is judged as 'No' in the step 103 and the step 104, the operation enters the step 106.

In the step 106, it is judged whether it is a fuel-jetting timing or not. In the case of the fuel-jetting timing, the jetting fuel pulse width $\tau$ is calculated by an equation $\tau = \tau_o + \tau_{Acc}$ in a step 107, and the jetting of fuel is executed in a step 108. The above described operation is repeated to control an air fuel ratio to an predetermined value.

Figure 3A:
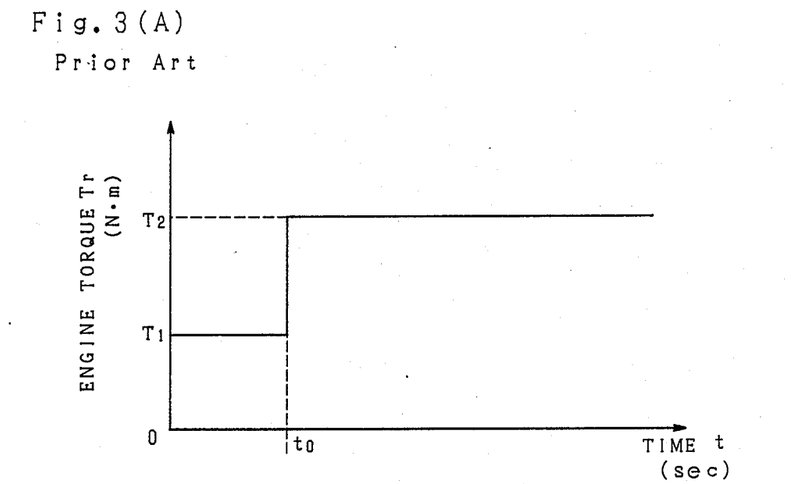
FIGS. 3A and 3B are timing chart thereof.

In addition, the value of the accelerated increase operated in the step 105 is previously determined so that a torque generated in the engine may be risen by step by step and then be constant in the case where the acceleration is performed at a time $t_o$, as shown in FIG. 3(A).

Figure 3B:
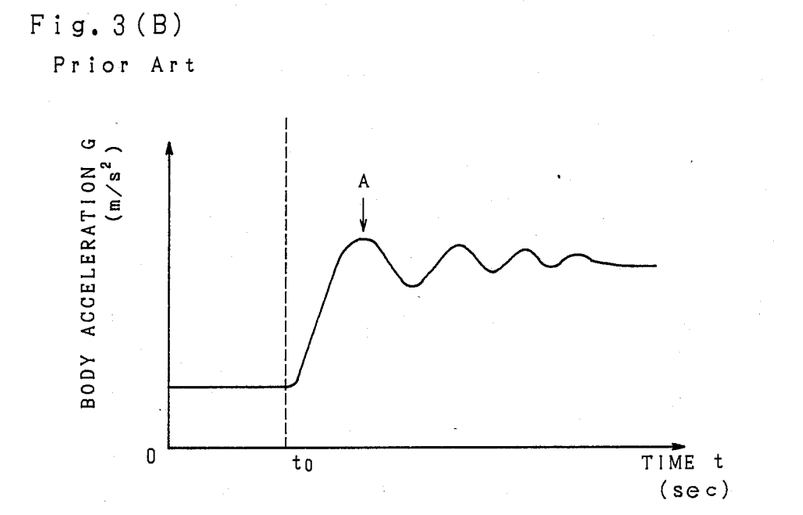

According to the conventional electronic controller for an internal combustion engine, only the output power of the engine is suddenly risen and then made constant without taking care of the generation of the vibration after the judgment of acceleration, as above described, and a problem has occurred in that an uncomfortable acceleration vibration of vehicle in longitudinal direction generated by a compound vibration system formed by connecting the engine and the vehicle, as shown in FIG. 3(B), can not be perfectly suppressed for all of various accelerating conditions.

SUMMARY OF THE INVENTION

The present invention has been achieved for eliminating the above described problems. Thus, it is a main object of the present invention to provide an electronic controller capable of suppressing an acceleration vibration of vehicle in longitudinal direction cars.

An electronic controller for an internal combustion engine according to the present invention is provided with a means for detecting an accelerated condition of a vehicle and a means for controlling a fuel supply quantity to the engine or an ignition timing to reduce an output power of the engine for a predetermined duration after a lapse of a predetermined time since a timing of acceleration condition of a vehicle.

Thus, since the output power of the engine is reduced for the predetermined duration before the first positive peak of the acceleration vibration in the longitudinal direction according to an increase of the output power of the engine is generated at a time when the vehicle is started to be accelerated, the acceleration vibration in the longitudinal direction of the vehicle can be suppressed.

The above and further objects and features of the invention will more fully be apparent from the following detailed description with accompanying drawings.

DESCRIPTION OF THE PREFERRED EMBODIMENTS

The preferred embodiment of the present invention will be below described with reference to the drawings.

Figure 4:
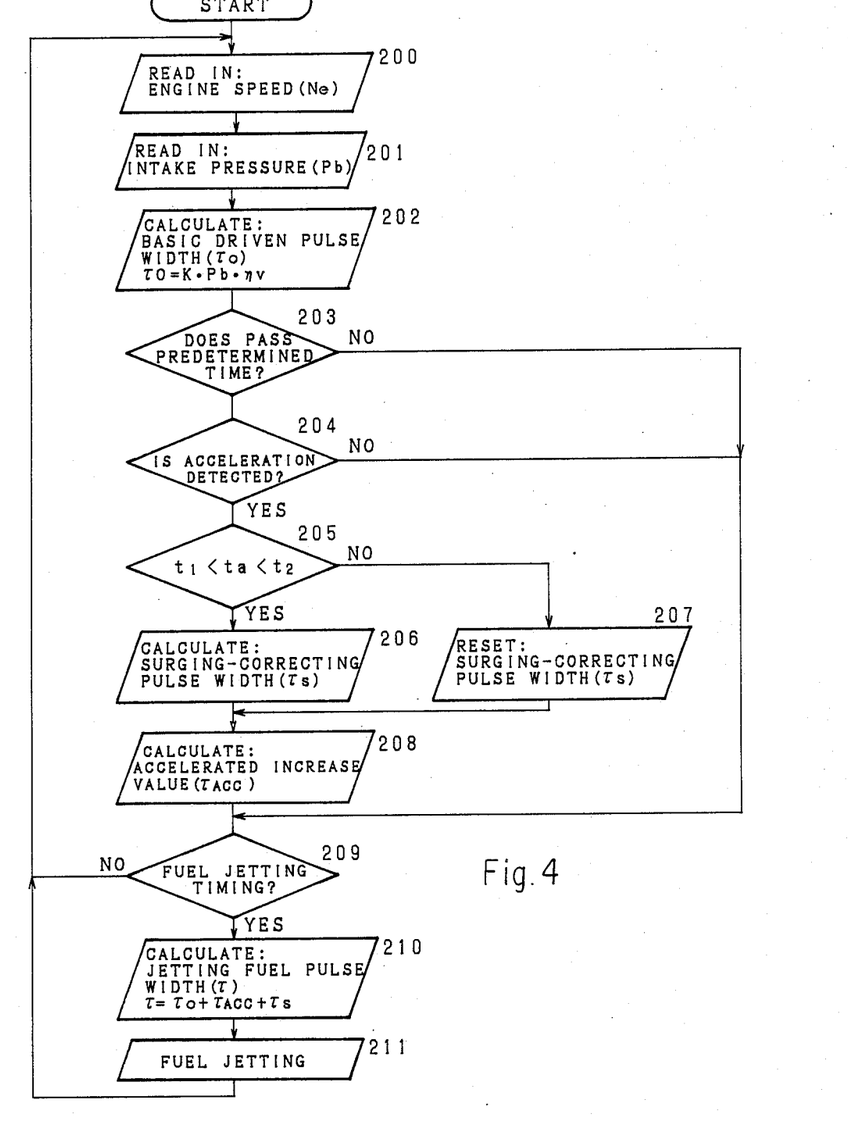
FIG. 4 is a flow chart showing a processing procedure of an electronic controller for an internal combustion engine according to the present invention.

One of preferred embodiment of an electronic controller for an internal combustion engine according to the present invention is same as the shown in FIG. 1 in construction but the former is different from the latter in operational processing in an operational unit with a micro processor 93 within a controller 9 as a headquarter and data setting, and the operational procedure is shown in a flow chart in FIG. 4. In addition, a reading of a revolution number Ne of an engine 1 in a step 200 to a detection of an acceleration in a step 204 are same as step 100 to 104 shown in FIG. 2.

That is to say, at first a pulse signal, that is, a revolution number Ne of the Engine 1, put in from a revolution sensor 5 in the step 200; in the step 201, a value of an intake pressure (absolute pressure) Pb within a suction pipe 2 obtained from a pressure sensor 4 being read into micro processor 93; and in the step 202, a basic driving pulse width $\tau_o$ of an injector 6 being calculated on the basis of the read-in informations. An operational equation is expressed by $$\tau_o = K \cdot Pb \cdot \eta v,$$

wherein K is constant; and $\eta v$ is a charging efficiency previously determined in correspondence to the intake pressure Pb within the suction pipe 2 and the revolution number Ne of the engine 1. Subsequently, the operation enters the step 204 periodically through the step 203, where it is judged whether a variation quantity of an output from a throttle-opening sensor 8 exceeds predetermined value or not and in the case where the variation quantity of the output from the throttle-opening sensor 8 exceeds the predetermined value, it is judged as an accelerated condition and the operation enters a step 205.

In the step 205, it is judged whether a time $t_a$, which is lapse of the time from the timing $t_o$ judged as the accelerated condition, meets a condition $t_1 < t_a < t_2$ or not, wherein $t_1$, $t_2$ are predetermined times before a timing when the first peak (point A) of an acceleration of a vehicle appears after the acceleration, as shown in FIG. 3, but after the start of acceleration. In the experimental where the acceleration is carried out for 100 msec from a timing of a third gear of the transmission gear ratio, revolution number of an engine of 1,500 rpm and pressure within the suction pipe of −450 mmHg to a point of full-opened throttle, $t_1 = 50$ msec and $t_2 = 80$ msec were suitable values.

In the case of 'Yes' in the step 205, the operation enters a step 206, where a surging-correcting pulse width $\tau_s$ is calculated. This correcting pulse width $\tau_s$ is previously determined by a function proportional to a variation of quantity of the throttle. On the other hand, in the case of 'No' in the step 205, the surging-correcting value $\tau_s$ is reset to zero in a step 207.

After the surging-correcting value $\tau_s$ was calculated in the steps 206, 207, a value $\tau_{Acc}$ of accelerated increase is calculated in a step 208. In the step 209, it is judged whether it is a fuel-jetting timing or not, and in the case of the fuel-jetting time, the jetting fuel pulse width $\tau$ is calculated by an equation $$\tau = \tau_o + \tau_{Acc} + \tau_s$$

in a step 210, and the injector 6 is driven by this pulse width to practice the jetting of fuel in a step 211 and then, the operation is returned to the step 200. In addition, in the case where it was judged not to be the fuel-jetting timing in the step 209, the operation is returned to the step 200.

The above described operation is repeated to control the quantity of fuel jetted so that the surging may be prevented from being generated when accelerated.

Figure 5A:
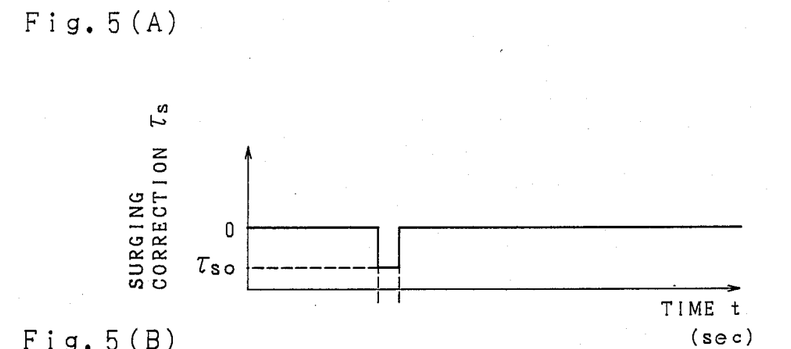
FIGS. 5A, 5B, 5C; 6A and 6B are timing charts thereof.
Figure 5B:
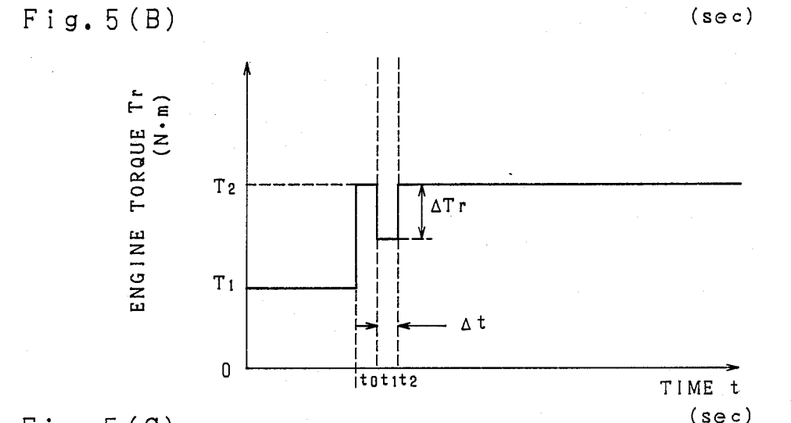
Figure 5C:
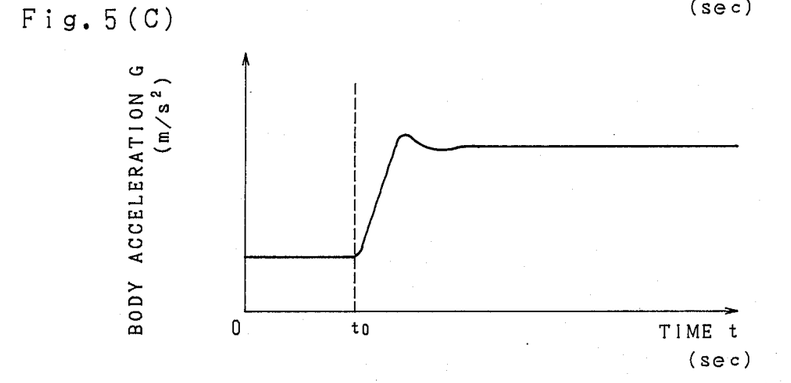

FIG. 5 shows operation when really accelerated in the processing shown in the above described flow chart, the jetting fuel pulse width $\tau$ being reduced by $\tau_o$ for the time $t_1$ to $t_2$ from the timing ($t_o$) of start of acceleration and a torque Tr generated in the engine being reduced by $\Delta$Tr to generate a negative acceleration for the vehicle. Accordingly, the peak A of acceleration shown in FIG. 3(B) is denied, and as a result, an output of body acceleration of the vehicle as shown in FIG. 5(C) is obtained to realize a smooth acceleration hardly the surging.

Figure 6A:
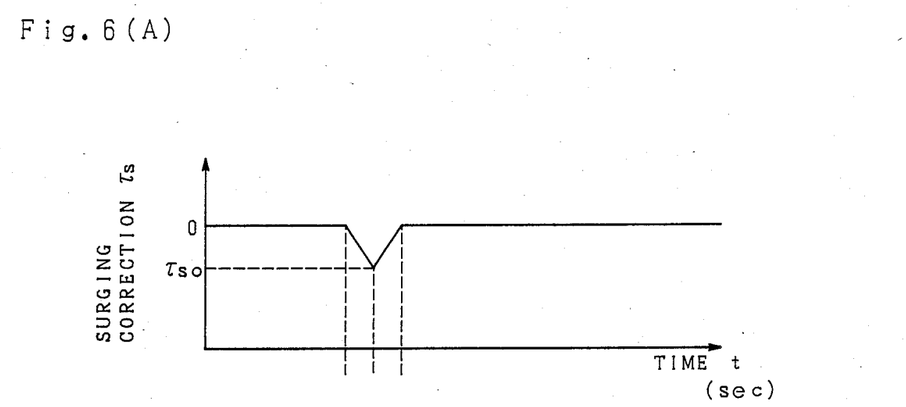
Figure 6B:
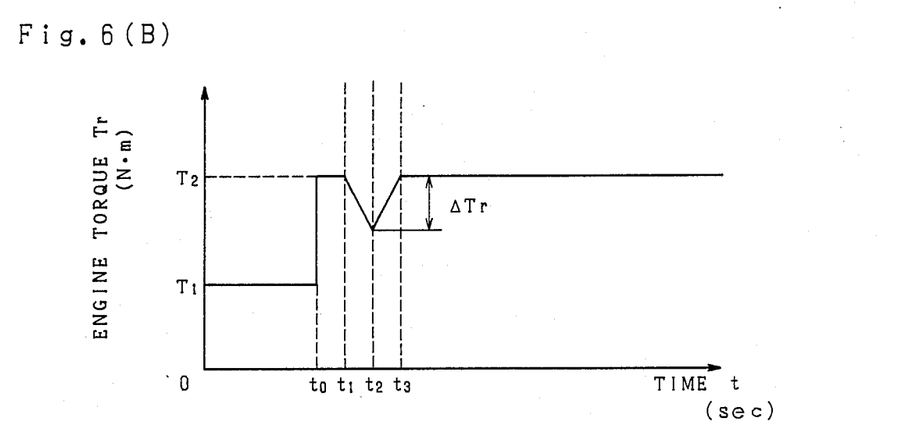

In addition, although the surging-correcting value $\tau$ was given in the pattern as shown in FIG. 5(A) in the above described preferred embodiment, it may be given in a pattern, which is a function of a time passing after the acceleration, as shown in FIG. 6(A). In this case, the torque Tr generated in the engine takes a value as shown in FIG. 6(B). In addition, although when the surging-correcting value $\tau_s$ was operated in FIG. 4, a transmission gear ratio was not taken into consideration in the abovedescribed preferred embodiment, it goes without saying that the similar effect can be exhibited even though this $\tau_s$ is changed according to the gear ratio. In addition although it was judged by the variation of quantity of the throttle-opening whether it is under the accelerated condition or not in FIG. 4, it may be judged by a variation of quantity of the pressure within the suction pipe. In addition, although the surging could be prevented by controlling the quantity of fuel jetted for the predetermined duration under the accelerated condition in the above described preferred embodiment, the similar effect can be realized also by controlling the ignition timing to a delay angle side to reduce the torque generated in the engine within the predetermined duration after the acceleration and generating the negative acceleration of for the vehicle.

Figure 7:
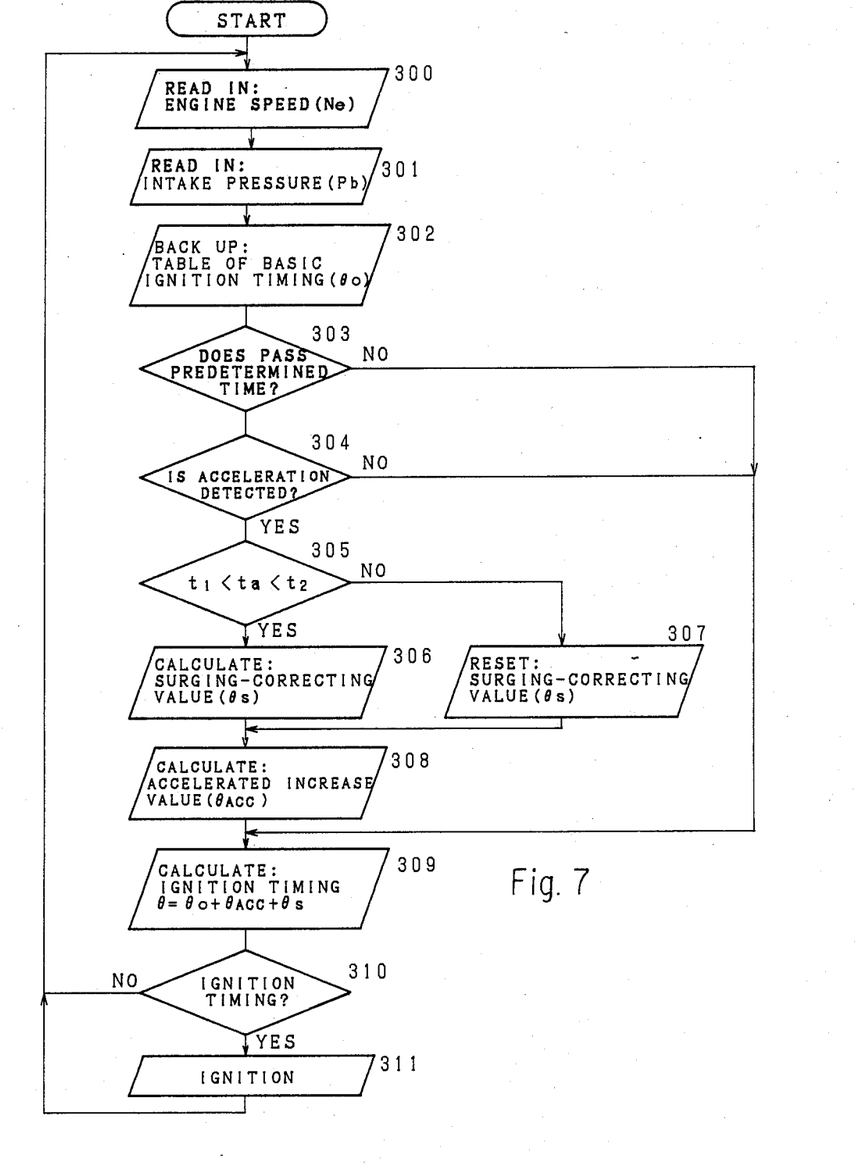
FIG. 7 is a flow chart showing a processing procedure of another embodiment of this invention.

Next, explanation will be given on an another embodiment of this invention with referring a flow chart shown in FIG. 7. In addition, reading of a revolution number Ne of the engine 1 in a step 300 to detection of acceleration in a step 305 are same as step 200 to 205 of the above mentioned embodiment shown in FIG. 4 except the step 302 in which the basic ignition timing $\theta_o$ is backed-up from a map data previously determined by engine revolution number Ne and suction rpressur Pb instead of the basic driven pulse width $\tau_o$.

In the case of 'Yes' in the step 305, the operation enters a step 306, where a surging-correcting value $\theta_s$ is calculated. This correcting value $\theta_s$ is previously determined by a function proportional to a variation of quantity of the throttle. On the other hand, in the case of 'No' in the step 305, the surging-correcting value $\theta_s$ is reset to zero in a step 307.

After the surging-correcting value $\theta_s$ was calculated in the steps 306, 307, an accelerated correcting value $\theta_{Acc}$ is calculated in a step 308. Next, ignition timing $\theta$ is calculated by an following equation $$\theta = \theta_o + \theta_{Acc} + \theta_s$$

in a step 309, and in the step 310, it is judged whether it is a fuel-jetting timing or not. If it is the ignition timing, the injector 6 is driven by this ignition timing $\theta$ by driving the output circuit 97 to practice the jetting of fuel in a step 311 and then, the operation is returned to the step 300. In addition, in the case where it was judged not to be the ignition timing in the step 310, the operation is returned to the step 300.

The above described operation is repeated to control the ignition timing so that the surging may be prevented from being generated when accelerated.

Furthermore, although a speed-density type fuel-jetting device was used as the fuel jetting system in this description, it goes without saying that also a fuel-jetting device using an air flow sensor and a system of an electronically controlled carburetor can be used.

As above described, according to the present invention, the jetting fuel pulse width is reduced or the ignition time is delayed in angle or the predetermined duration after the timing when it was judged to the under the accelerated condition, whereby reducing the output power of the engine to generate the acceleration denying the uncomfortable vibration due to the acceleration. Thus, the surging can be prevented from being generated and a smooth acceleration feeling can be obtained when the vehicle is accelerated.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the clams, or equivalence of such meets and bounds thereof are therefore intended to be embraced by the claims.

What is claimed is:

1. An electronic controller for an internal combustion engine which controls an output power of said internal combustion engine for driving a vehicle by controlling at least a quantity of fuel to said internal combustion engine corresponding to an operation condition of said internal combustion engine, comprising:
   an acceleration-detecting means for detecting an accelerated condition of said vehicle;
   a time-measuring means for measuring a lapse of a predetermined time from detection of the accelerated condition of said vehicle detected by said acceleration-detecting means;
   a memory means for storing a function representing a reduction pattern of an output power of said internal combustion engine to suppress acceleration vibration of said vehicle; and
   a fuel-controlling means for controlling the fuel supply quantity during acceleration to reduce the output power of said internal combustion engine during a predetermined duration according to said function only after said lapse of a predetermined time has been measured by said time-measuring means.

2. An electronic controller for an internal combustion engine as set forth in claim 1, in which said acceleration-detecting means is a detector for an opening of the throttle valve of said internal combustion engine.

3. An electronic controller for an internal combustion engine as set forth in claim 1, in which said acceleration-detecting means is a detector for a variation of a pressure in the suction pipe of said internal combustion engine.

4. An electronic controller for an internal combustion engine as set forth in claim 1, in which said function has a pattern of reducing the output power of said internal combustion engine by an predetermined quantity during said predetermined duration.

5. An electronic controller for an internal combustion engine as set for in claim 1, in which said function has a pattern of gradually reducing and then gradually increasing the output power of said internal combustion engine during said predetermined duration.

6. An electronic controller for an internal combustion engine which controls an output power of said internal combustion engine for driving a vehicle by controlling at least an ignition timing of said internal combustion engine corresponding to a operation condition of said internal combustion engine, comprising:
   an acceleration-detecting means for detecting an accelerated condition of said vehicle;
   a time-measuring means for measuring a lapse of a predetermined time from a detection of the accelerated condition of said vehicle detected by said acceleration-detecting means;
   a memory means for storing a function representing a reduction pattern of an output power of said internal combustion engine to suppress acceleration vibration of said vehicle; and
   a fuel-controlling means for controlling the ignition timing during acceleration to delay said timing to reduce the output power of said internal combustion engine during a predetermined duration according to said function only after said lapse of a predetermined time has been measured by said timemeasuring means.

7. An electronic controller for an internal combustion engine as set forth in claim 6, in which said acceleration-detecting means is a detector for an opening of the throttle valve of said internal combustion engine.

8. An electronic controller for an internal combustion engine as set forth in claim 6, in which said acceleration-detecting means is a detector for a variation of a pressure in the silicon pipe of said internal combustion engine.

* * * * *